United States Patent
Koguchi (10) Patent No.: US 7,319,704 B2
(45) Date of Patent: Jan. 15, 2008

(54) SEMICONDUCTOR DEVICE CAPABLE OF CORRECTING TIME STAMP AND METHOD OF CORRECTING TIME STAMP

(75) Inventor: Hiroshi Koguchi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 883 days.

(21) Appl. No.: 10/669,240

(22) Filed: Sep. 23, 2003

(65) Prior Publication Data

US 2004/0136375 A1 Jul. 15, 2004

(30) Foreign Application Priority Data

Sep. 30, 2002 (JP) .......................... P2002-288101

(51) Int. Cl.
*H04J 3/06* (2006.01)
(52) U.S. Cl. ...................... 370/509; 370/516
(58) Field of Classification Search .................. None
See application file for complete search history.

(56) References Cited

U.S. PATENT DOCUMENTS 6,661,811 B1* 12/2003 Baker .......................... 370/516
7,035,272 B2* 4/2006 Nomura ....................... 370/412

FOREIGN PATENT DOCUMENTS

| JP | 10-509294 T | 9/1998 |
|---|---|---|
| JP | 11-261579 | 9/1999 |
| JP | 11-289320 | 10/1999 |
| JP | 11-317748 | 11/1999 |
| JP | 2000-332798 | 11/2000 |

OTHER PUBLICATIONS

Official Action Letter dated Apr. 19, 2005 corresponding to the counterpart Japanese Patent Application No. 2002-288101 and an English Translation thereof.

* cited by examiner

*Primary Examiner*—Chau Nguyen
*Assistant Examiner*—Marcus Smith
(74) *Attorney, Agent, or Firm*—DLA Piper US LLP (57) ABSTRACT

A device capable of correcting time stamp value according to an embodiment of the present invention including an original time counter configured to generate and output an original time value, a subtracter configured to receive a network time value from the outside and the original time value from the original time counter, subtract the original time value from the network time value, and output the difference as a cycle-time difference value, and a first adder configured to receive an original time-stamp value generated from the original time value and the cycle-time difference value from the subtracter, add the cycle-time difference value to the original time-stamp value, and output the sum as a time-stamp value.

14 Claims, 7 Drawing Sheets

SEMICONDUCTOR DEVICE CAPABLE OF CORRECTING TIME STAMP AND METHOD OF CORRECTING TIME STAMP

CROSS REFERENCE TO RELATED APPLICATIONS

This application is based upon and claims the benefit of priority from the prior Japanese Patent Application No. 2002-288101 filed on Sep. 30, 2002; the entire contents of which are incorporated herein by reference.

BACKGROUND OF THE INVENTION

1. Field of the Invention

The present invention relates to a time-stamp corrector providing smooth playback of real-time data in a network that connects, for example, digital video cameras (DV cameras), televisions (TVs), and personal computers (PCs) to one another, and a method of correcting a time stamp.

2. Description of Related Art

Figure 1:
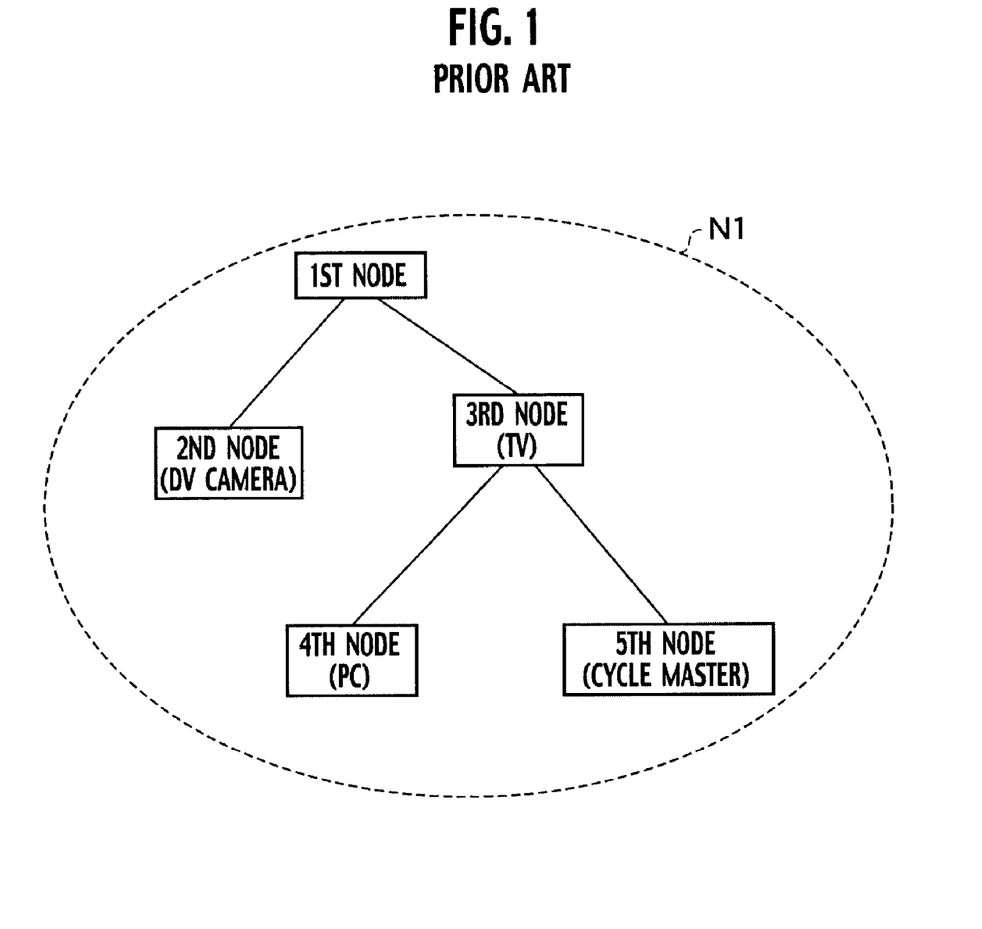
FIG. 1 shows a network N1 consisting of first to fifth nodes according to a related art.

A network that connects devices to one another frequently shares time information (hereinafter referred to as network time). For example, in FIG. 1, a first node, a second node (for example, a DV camera), a third node (for example, a TV), a fourth node (for example, a PC), and a fifth node form an EEE-1394 network N1. In the network, the first to fourth nodes share cycle time notified by cycle start packets from the fifth node serving as a cycle master. "Cycle time" is a term used by IEEE 1394 to refer to the network time.

Figure 2A:
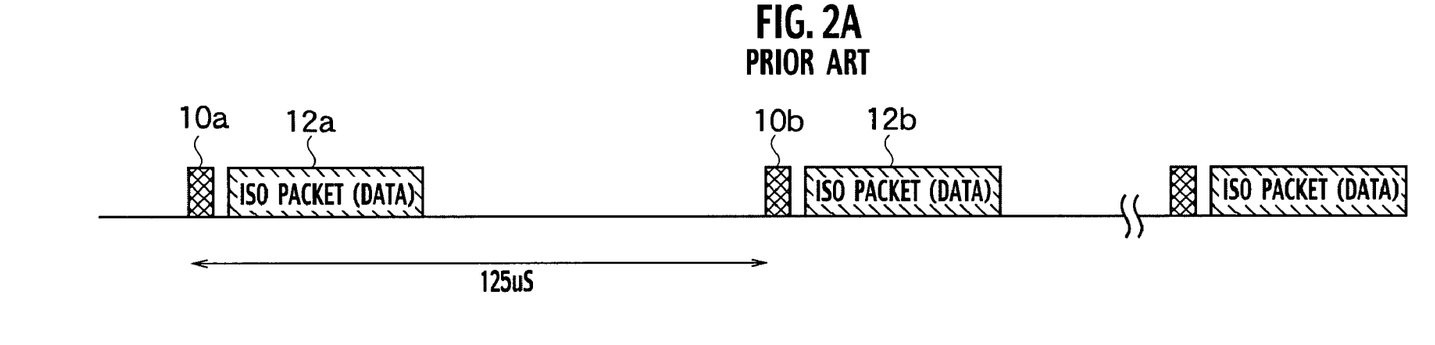
FIG. 2A shows a relationship between cycle start packets and ISO packets, FIG. 2B a format of a cycle start packet, and FIG. 2C a format of an ISO packet according to a related art.

In FIG. 2A, the IEEE-1394 network transmits cycle start packets 10a, 10b, and the like at intervals of 125 microseconds, and following the cycle start packets respectively, isochronous (ISO) packets 12a, 12b, and the like containing real-time data such as music and video data.

Figure 2B:
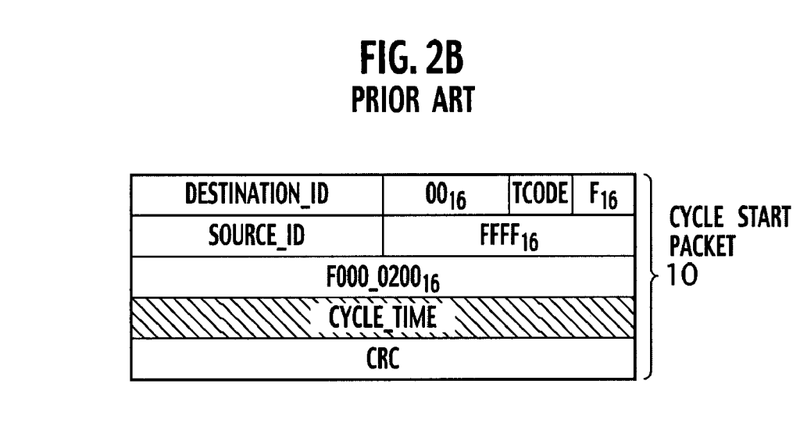

In FIG. 2B, a cycle start packet 10 includes a source ID to identify a device that transmits real-time data (hereinafter referred to as "transmitting device"), a destination ID to identify a device that receives the real-time data (hereinafter referred to as "receiving device"), and a cycle time (CYCLE-TIME).

Figure 2C:
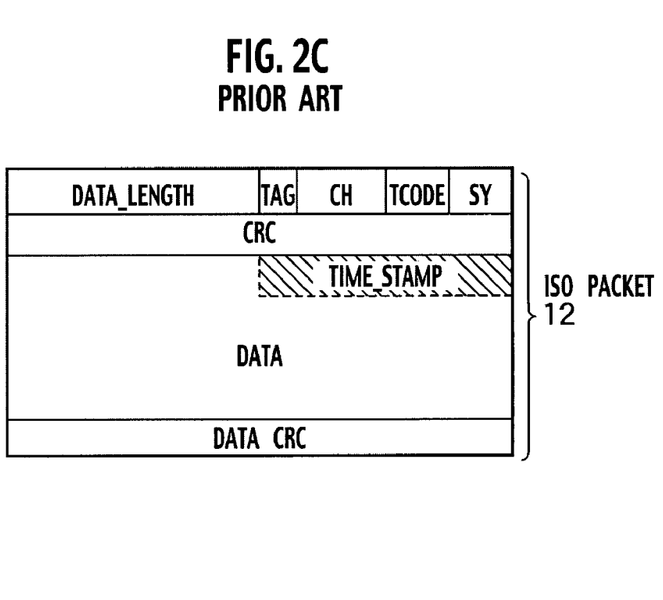

In FIG. 2C, an ISO packet 12 includes a time stamp as well as real-time data such as music and video data. The time stamp indicates the time the receiving device plays the real-time data and is calculated by adding an offset value to a cycle-time value.

To transmit real-time data in synchronization with network time, the real-time data is temporarily stored in a storage device such as a synchronizing first-in, first-out (FIFO) memory. If the cycle time discontinuously changes, the real-time nature of the real-time data will not be maintained. For example, integrating a plurality of IEEE-1394 networks having different cycle times into one may cause such a cycle time discontinuity.

Figure 3:
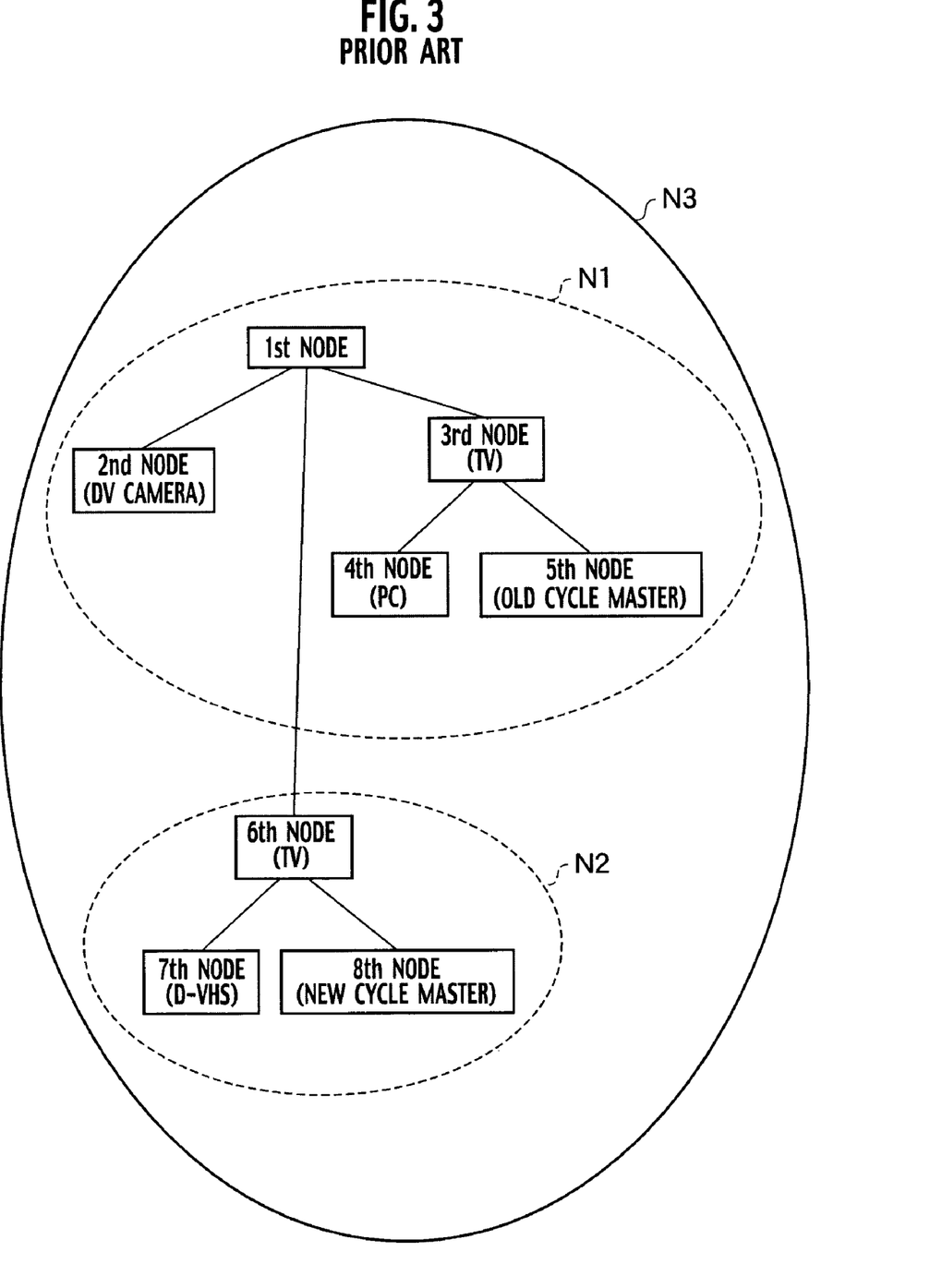
FIG. 3 shows a network N1 consisting of first to fifth nodes and a network N2 consisting of sixth to eighth nodes according to a related art, the networks N1 and N2 being linked with each other into a network N3.

In FIG. 3, a first network N1 consists of first to fifth nodes, and a second network N2 consists of sixth to eighth nodes. The first and second networks N1 and N2 are integrated into a new network N3 by connecting the first and sixth nodes to each other. In the new network N3, the eighth node serves as a cycle master. Before integration, the first to fourth nodes have received cycle start packets from the fifth node, and after integration, the first to fourth nodes receive cycle start packets from the eighth node. Namely, for the first to fourth nodes, the cycle master has been changed from the fifth node to the eighth node due to the network integration.

Figure 4:
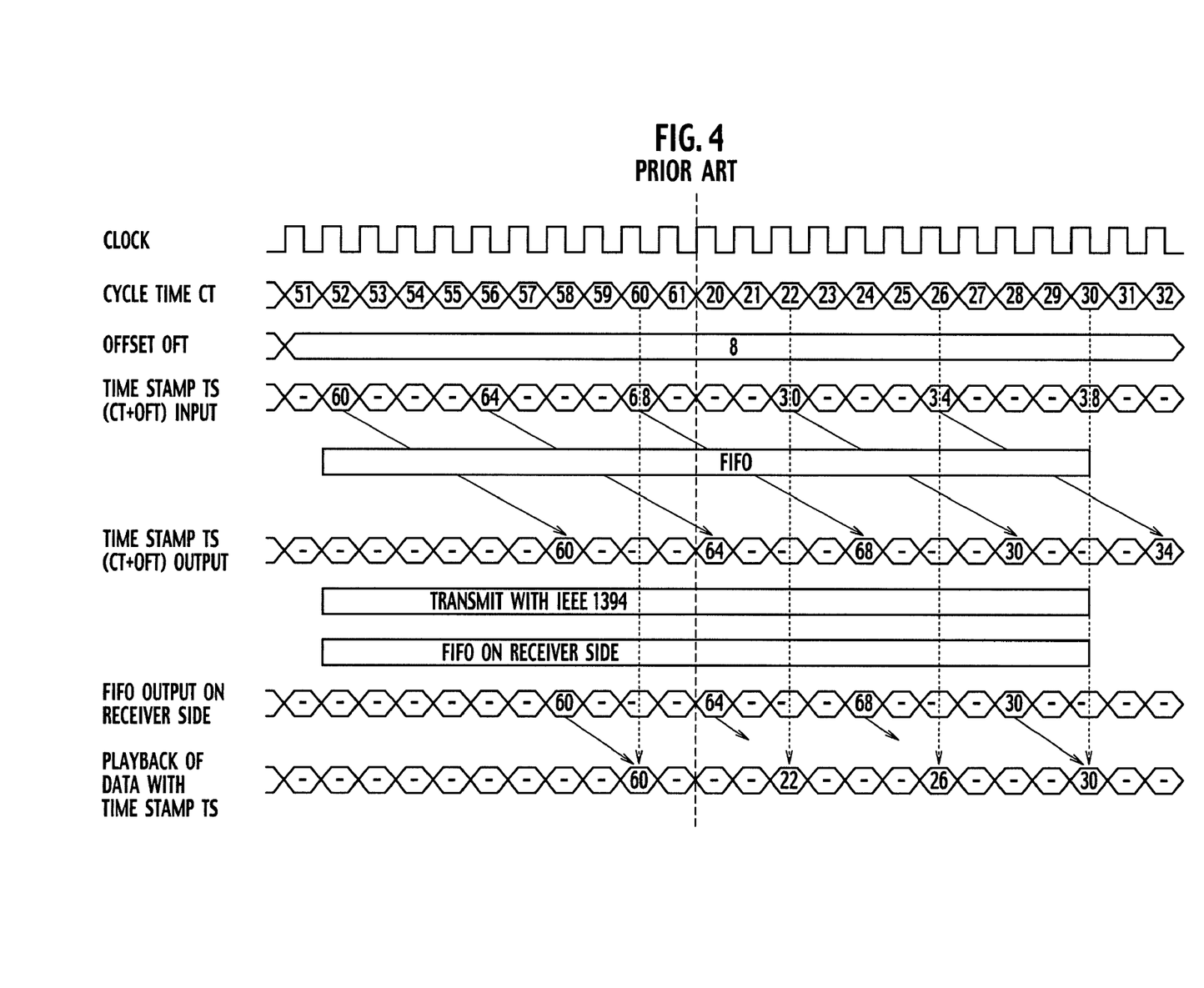
FIG. 4 is a timing chart showing relationships among a clock signal, cycle-time values CT, offset value OFT, time-stamp values TS, and the like according to a related art.

As shown in FIG. 4, changing the cycle master in such a way may discontinuously change the value of cycle time CT contained in cycle packets from, for example, "61" to, for example, "20."

In FIG. 4, a conventional transmitting device conforming to the IEEE-1394 standard adds an offset value OFT to the cycle-time value CT to provide a time-stamp value TS, which is included in an ISO packet. The ISO packet is stored in a synchronizing FIFO memory, and after predetermined clock periods (for example, six clock periods), is output from the synchronizing FIFO memory. The transmitting device may employ one or more cycle time counters. The ISO packet from the synchronizing FIFO memory is transmitted according to the IEEE-1394 standard, is received by a FIFO memory of a receiving device, and will be ready for play. The ISO packet may be kept in the FIFO memory of the receiving device for several clock periods. However, for the sake of simplicity of explanation, the example of FIG. 4 assumes that the ISO packet will be ready to play as soon as it is received by the FIFO memory of the receiving device. When the time-stamp value TS of the ISO packet agrees with a cycle-time value CT, the real-time data in the ISO packet is played.

For example, in FIG. 4, an ISO packet having a time-stamp value TS of "60" derived by adding an offset value OFT of "8" to a cycle-time value CT of "52" is input into the FIFO memory of the transmitting device. At a cycle-time value CT of "58," the ISO packet is output from the FIFO memory of the transmitting device and becomes ready to be output from the FIFO memory of the receiving device. Two clock periods after that, at a cycle-time value CT of "60", data in the ISO packet containing the time-stamp value TS of "60" is played.

Also in FIG. 4, an ISO packet having a time-stamp value TS of "64" derived by adding the offset value OFT of "8" to a cycle-time value CT of "56" is input into the FIFO memory of the transmitting device, and the value of the cycle time CT is discontinuously changed from "61" to "20" just before the ISO packet is output from the FIFO memory of the transmitting device. At the cycle-time value CT of "20," the ISO packet becomes ready to be output from the FIFO memory of the receiving device. Two clock periods after that, the cycle time CT takes a value of "22" which disagrees with the time-stamp value TS of "64," and therefore, data in the ISO packet will not be played.

Similarly, an ISO packet having a time-stamp value TS of "68" derived by adding the offset value of "8" to a cycle-time value CT of "60" is input into the FIFO memory of the transmitting device, and the value of the cycle time CT is discontinuously changed from "61" to "20" before the ISO packet is output from the FIFO memory of the transmitting device. When the cycle time CT takes a value of "24," the ISO packet becomes ready to be output from the FIFO memory of the receiving device. Two clock periods after that, the cycle time CT takes a value of "26" which disagrees with the time-stamp value TS of "68," and therefore, data in the ISO packet will not be played.

In this way, if the value of the cycle time CT is discontinuously changed after ISO packets are input into the synchronizing FIFO memory of the transmitting device and before the ISO packets are output therefrom, the ISO packets that have been input into the synchronizing FIFO memory before the change of the cycle time CT will not be played even when such packets are ready to be output from the synchronizing FIFO memory of the receiving device because time-stamp values in the ISO packets disagree with the values of the cycle time CT. This causes a partial loss of, for example, video images to be played on the receiving device.

The ISO packets that are not played are accumulated in the synchronizing FIFO memory of the receiving device. The accumulated unplayed packets will gradually increase, and the synchronizing FIFO memory of the receiving device will be filled with the unplayed packets and will be unable to receive new packets.

SUMMARY OF THE INVENTION

A device capable of correcting time stamp value according to an embodiment of the present invention including an original time counter configured to generate and output an original time value, a subtracter configured to receive a network time value from the outside and the original time value from the original time counter, subtract the original time value from the network time value, and output the difference as a cycle-time difference value, and a first adder configured to receive an original time-stamp value generated from the original time value and the cycle-time difference value from the subtracter, add the cycle-time difference value to the original time-stamp value, and output the sum as a time-stamp value.

DETAILED DESCRIPTION OF EMBODIMENTS

An embodiment of the present invention will be described with reference to the accompanying drawings. It is to be noted that the same or similar reference numerals are applied to the same or similar parts and elements throughout the drawings, and the description of the same or similar parts and elements will be omitted or simplified.

Figure 5:
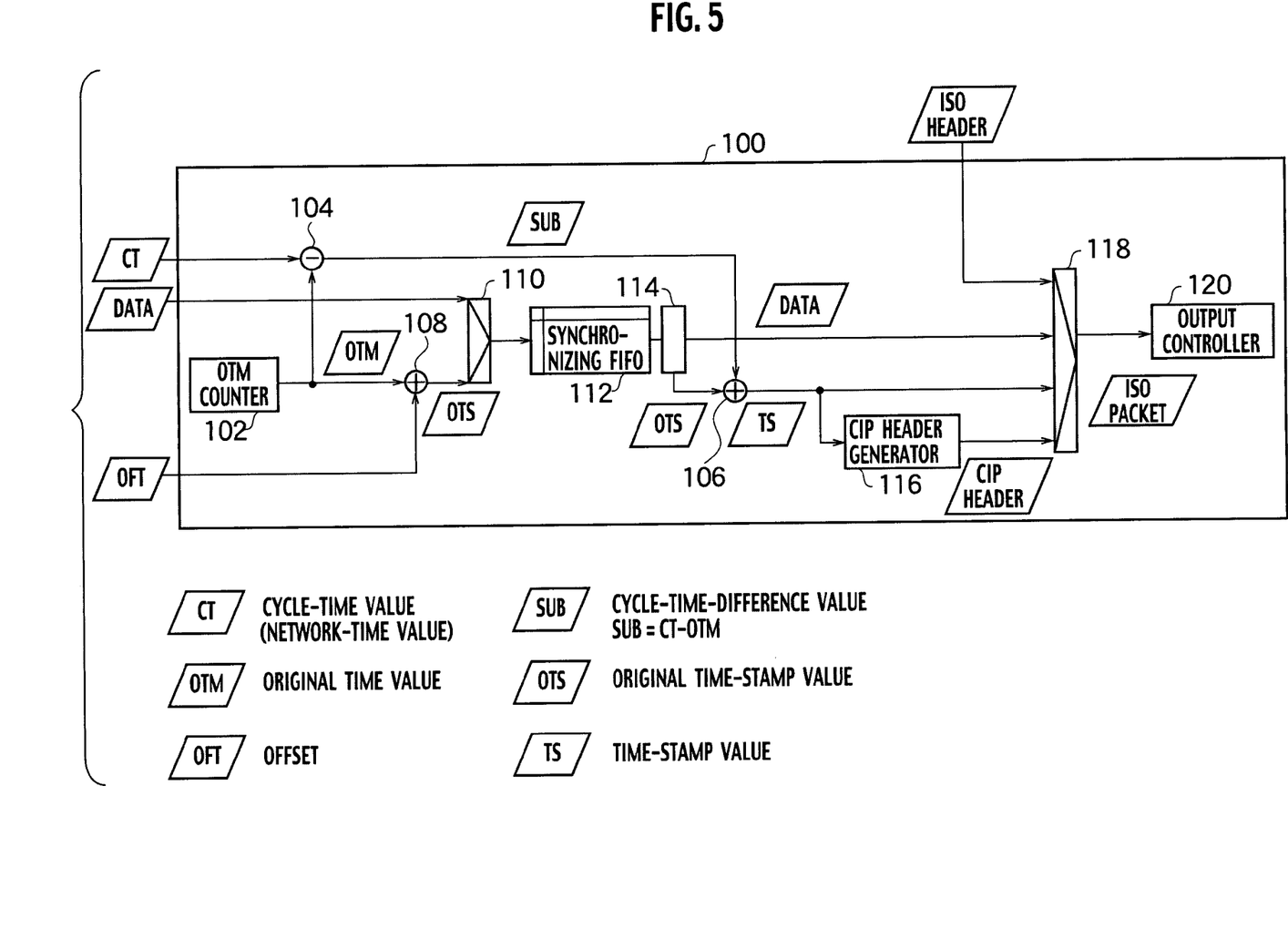
FIG. 5 is a block diagram generally showing a time-stamp corrector according to an embodiment of the present invention.

FIG. 5 shows a time-stamp corrector 100 according to an embodiment of the present invention. The time-stamp corrector 100 includes an original time counter 102, a subtracter 104, a first adder 106, a second adder 108, an original time-stamp value attacher 110, a synchronizing FIFO memory 112, an original time-stamp value separator 114, a common isochronous packet (CIP) generator 116, an ISO packet generator 118, and an output controller 120.

The original time counter 102 counts time (original time) specific to the time-stamp corrector 100 in synchronization with a clock signal. The "time specific to the time-stamp corrector" is time that is never affected by a discontinuous change in cycle time caused when a cycle master is changed to another.

The subtracter 104 receives a cycle-time value CT from the outside of the time-stamp corrector 100 and an original time value OTM from the original time counter 102, subtracts the original time value OTM from the cycle-time value CT, and provides the difference as a cycle-time difference value SUB. The cycle-time value CT is supplied from a cycle master of a node that may be the same as or different from the node where the time-stamp corrector 100 is present. The "node" may be any one of the first to eighth nodes shown in FIGS. 1 and 3. The same applies to the explanations of the second adder 108, original time-stamp value attacher 110, and ISO packet generator 118.

The first adder 106 receives an original time-stamp value OTS from the original time-stamp value separator 114 and the cycle-time difference value SUB from the subtracter 104, adds the original time-stamp value OTS to the cycle-time difference value SUB, and provides the sum as a time-stamp value TS.

The second adder 108 receives an offset value OFT from the outside of the time-stamp corrector 100 and the original time value OTM from the original time counter 102, adds the offset value OFT to the original time value OTM, and provides the sum as the original time-stamp value OTS. The offset value OFT is supplied from a register in the same node where the time-stamp corrector 100 is present.

The original time-stamp value attacher 110 receives real-time data from the outside of the time-stamp corrector 100, the original time-stamp value OTS from the second adder 108, attaches the original time-stamp value OTS to the real-time data, and provides the original time-stamp value attached real-time data. The real-time data is supplied from the same node where the time-stamp corrector 100 is present.

The synchronizing FIFO memory 112 receives the original time-stamp value attached real-time data from the original time-stamp value attacher 110 and outputs the same in a first-in, first-out manner after predetermined clock periods.

The original time-stamp value separator 114 receives the original time-stamp value attached real-time data from the synchronizing FIFO memory 112, separates the same into the original time-stamp value OTS and the real-time data, and outputs the separated value and data.

The CIP header generator 116 receives the time-stamp value TS from the first adder 106, generates a CIP header, and outputs the generated CIP header. The CIP header is positioned at the start of a data field of an ISO packet, and according to an IEEE-1394 protocol, may include information (for example, a time stamp) related to real-time data that follows the CIP header in the data field of the ISO packet.

The ISO packet generator 118 receives an ISO (isochronous) header from the outside of the time-stamp corrector 100, the CIP header from the CIP header generator 116, the time-stamp value TS from the first adder 106, and the real-time data from the original time-stamp value separator 114. The ISO header is supplied from the same node where the time-stamp corrector 100 is present. If the CIP header includes the time-stamp value TS, the ISO packet generator 118 generates an ISO packet that contains the ISO header, CIP header, and real-time data. If the CIP header contains no time-stamp value, the ISO packet generator 118 generates an ISO packet that contains the ISO header, CIP header, time-stamp value, and real-time data. The ISO header includes a data length (Data_length), an isochronous data format tag (tag), an isochronous channel number (Ch), a transaction code (tcode), a synchronous code (sy), and a header CRC.

The output controller 120 receives the ISO packet and transmits the same according to the IEEE-1394 protocol.

Figure 6:
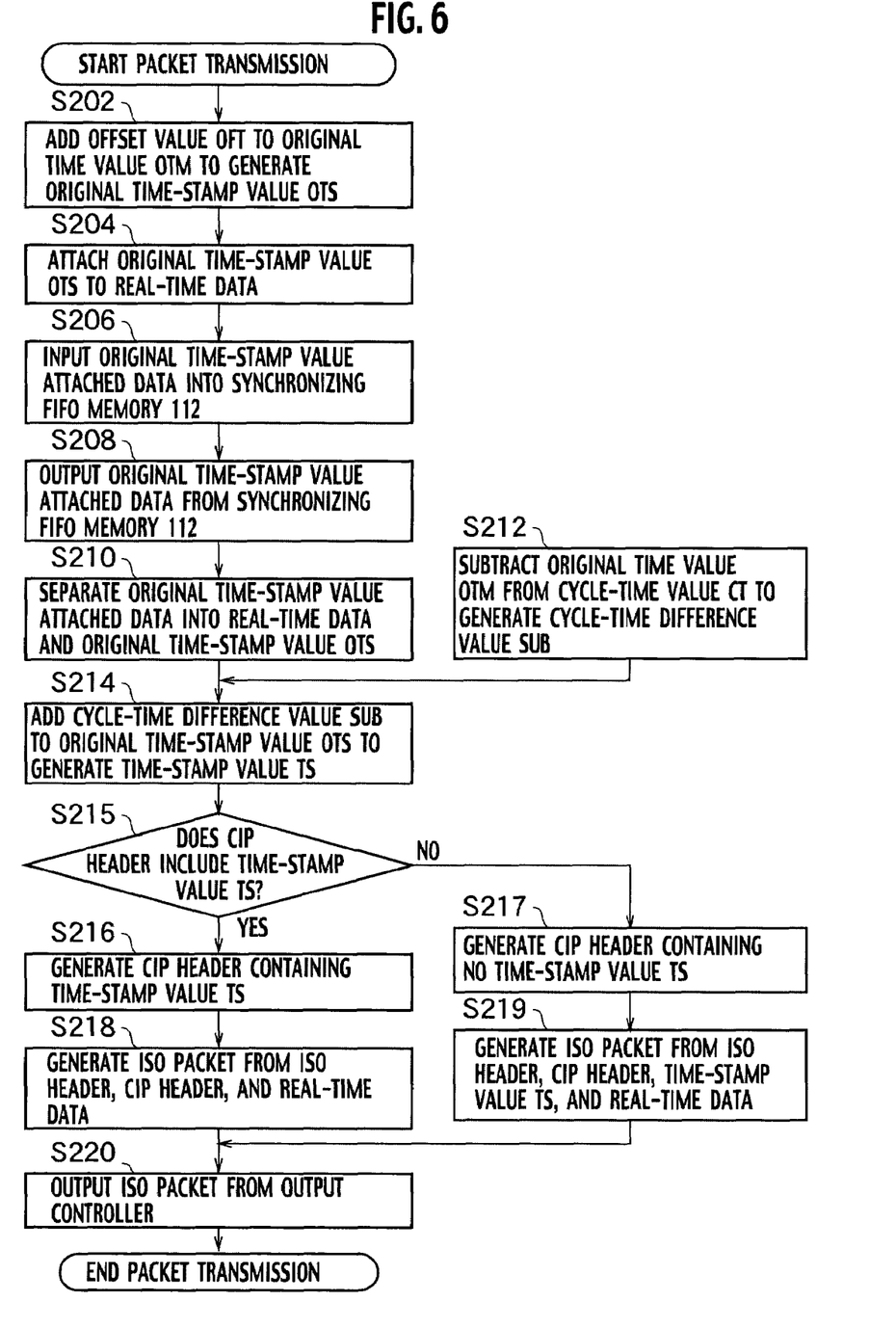
FIG. 6 is a flowchart showing a flow of processes of a method of correcting a time stamp according to an embodiment of the present invention.

Next, reference is made to FIG. 6 and a flow of processes of a method of correcting a time stamp according to an embodiment of the present invention will be explained. This embodiment employs the second adder 108 to add an offset value OFT to an original time value OTM and generate an original time-stamp value OTS (step S202).

Thereafter, the original time-stamp value attacher 110 attaches the original time-stamp value OTS to real-time data (step S204) and stores the resultant data in the synchronizing FIFO memory 112 (step S206).

After several clock periods, the synchronizing FIFO memory 112 outputs the original time-stamp value attached real-time data (step S208). The original time-stamp value separator 114 separates the received data into the real-time data and the original time-stamp value OTS (step S210).

In the meantime, the subtracter 104 subtracts the original time value OTM from a cycle-time value CT and provides a cycle-time difference value SUB (step S212). The first adder 106 adds the cycle-time difference value SUB to the original time-stamp value OTS and generates a time-stamp value TS (step S214).

If a CIP header is to include the time-stamp value TS (YES in step S215), the time-stamp value TS is supplied to the CIP header generator 116, which generates a CIP header (step S216) containing the time-stamp value TS. The ISO packet generator 118 receives an ISO header from the outside, the CIP header from the CIP header generator 116, and the real-time data from the original time-stamp value separator 114 and generates an ISO packet (step S218).

If a CIP header must include no time-stamp value (NO in step S215), the CIP header generator 116 generates a CIP header containing no time-stamp value (step S217). The ISO packet generator 118 receives an ISO header from the outside, the CIP header from the CIP header generator 116, the time-stamp value TS from the first adder 106, and the real-time data from the original time-stamp value separator 114, and generates an ISO packet (step S219).

Thereafter, the output controller 120 receives the ISO packet from the ISO packet generator 118 and outputs the same according to the IEEE-1394 protocol (step S220).

Figure 7:
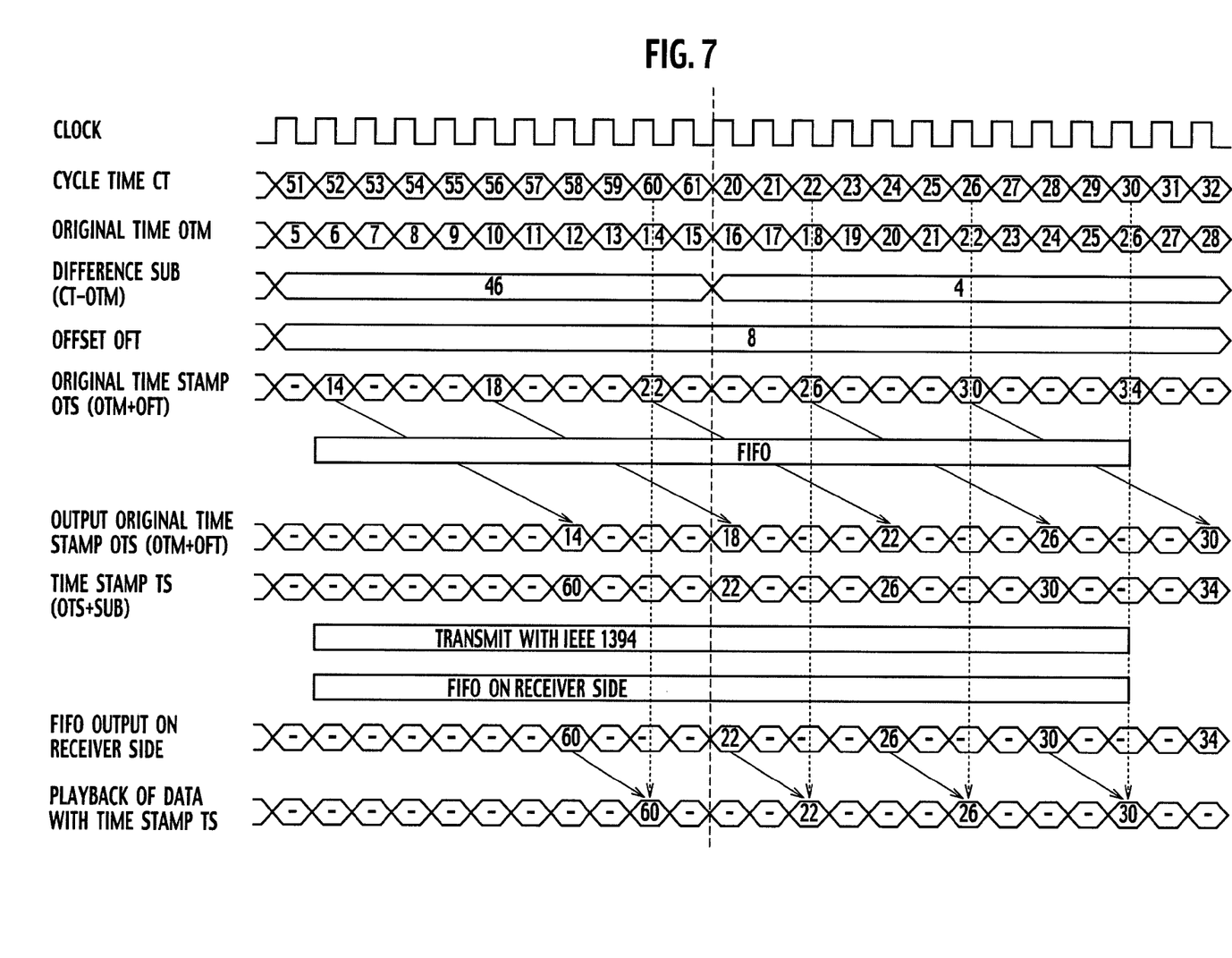
FIG. 7 is a timing chart showing relationships among a clock signal, cycle-time values CT, original time values OTM, cycle-time difference values SUB, offset values OFT, original time-stamp values OTS, time-stamp values TS, and the like according to an embodiment of the present invention.

Next, reference is made to the time chart of FIG. 7 and examples according to the embodiment will be explained. In FIG. 7, a cycle-time value CT of "52" corresponds to an original time value OTM of "6" and an offset value OFT of "8," and therefore, an original time-stamp value OTS of "14" is derived. A data packet containing the original time-stamp value OTS of "14" is input into the synchronizing FIFO memory 112 at the cycle-time value CT of "52." After six clock periods, at a cycle-time value CT of "58," the synchronizing FIFO memory 112 outputs the data packet.

The cycle-time value CT of "58" corresponds to an original time value OTM of "12," and therefore, a cycle-time difference value SUB of "46" is derived. Consequently, the original time-stamp value OTS of "14" from the synchronizing FIFO memory 112 and the cycle-time difference value SUB of "46" provide a sum of "60" serving as a time-stamp value TS.

Two clock periods after the FIFO memory (not shown) of the receiving device becomes ready to output the ISO packet, the cycle time CT reaches a value of "60" which agrees with the time-stamp value TS of "60," and therefore, real-time data in the ISO packet is played.

At a cycle-time value CT of "56," an original time value OTM of "10" and the offset value OFT of "8" provide a sum of "18" serving as an original time-stamp value OTS. A data packet containing this original time-stamp value OTS of "18" is input into the synchronizing FIFO memory 112 at the cycle-time value CT of "56." Six clock periods thereafter, the data packet is output from the synchronizing FIFO memory 112. Just before the synchronizing FIFO memory 112 outputs this data packet, the value of the cycle time CT discontinuously changes from "61" to "20." This new cycle-time value CT of "20" corresponds to an original time value OTM of "16," to provide a cycle-time difference value SUB of "4." Consequently, the sum of the original time-stamp value OTS of "18" and the cycle-time difference value SUB of "4" provides a time-stamp value TS of "22."

Two clock periods after the FIFO memory of the receiving device becomes ready to output the ISO packet, the cycle time CT reaches a value of "22" which agrees with the time-stamp value TS of "22," and therefore, real-time data in the data packet is played.

Similarly, at a cycle-time value CT of "60," an original time value OTM of "14" and the offset value OFT of "8" provide an original time-stamp value OTS of "22." A data packet containing the original time-stamp value OTS of "22" is input into the synchronizing FIFO memory 112 at the cycle-time value CT of "60." Six clock periods thereafter, the data packet is output from the FIFO memory 112. Before the synchronizing FIFO memory 112 outputs this data packet, the value of the cycle time CT discontinuously changes from "61" to "20." When the new cycle time CT reaches a value of "24," the original time OTM takes a value of "20" to provide a cycle-time difference value SUB of "4." Consequently, the original time-stamp value OTS of "22" from the synchronizing FIFO memory 112 and the cycle-time difference value SUB of "4" provide a time-stamp value TS of "26."

Two clock periods after the FIFO memory of the receiving device becomes ready to output the data packet, the cycle time CT reaches a value of "26" which agrees with the time-stamp value TS of "26," and therefore, real-time data in the data packet is played.

In this way, according to the embodiment, the value of the cycle time CT may discontinuously change after original time-stamp value attached real-time data is input into the synchronizing FIFO memory 112 of the transmitting device and before the same data is output from the FIFO memory 112. Even in such a case, the embodiment finds a time-stamp value TS with the use of an original time-stamp value OTS and a cycle-time difference value SUB after the synchronizing FIFO memory 112 outputs the original time-stamp value attached real-time data. As a result, the discontinuous change in the cycle time CT never affects the playback of real-time data. Namely, the embodiment can play real-time data without losses or blank periods. According to the embodiment, unplayed data will never be accumulated in the synchronizing FIFO memory of the receiving device. Namely, the FIFO memory of the receiving device is never filled with unplayed data, and therefore, can always receive new data.

According to the above-mentioned embodiment, the processes of (1) generating a cycle-time difference value SUB by subtracting an original time value OTM from a cycle-time value CT, (2) generating an original time-stamp value OTS by adding an offset value OFT to the original time value OTM, and (3) generating a time-stamp value TS by adding the cycle-time difference value SUB to the original time-stamp value OTS are carried out by using the first and second adders and subtracter arranged in the time-stamp corrector 100. All or part of these processes may be carried out by using adders or subtracters arranged outside the time-stamp corrector 100.

For example, the cycle-time difference value SUB and original time-stamp value OTS may be input into a CPU arranged outside the time-stamp corrector, to make the CPU calculate "cycle-time difference value SUB+ original time-stamp value OTS." A result of the calculation is returned to the CIP header generator 116 and ISO packet generator 118. In this way, the operations of the second adder can be executed by an external CPU.

In another example, the cycle-time value CT, original time value OTM, and original time-stamp value OTS may be input into an external CPU, to make the CPU calculate "cycle-time value CT–original time value OTM+original time-stamp value OTS." A result of the calculation is returned to the CIP header generator 116 and ISO packet generator 118. In this way, the operations of the subtracter and second adder can be executed by an external CPU.

Although the above-mentioned embodiment of the present invention has been explained in connection with the execution thereof on the IEEE-1394 standard, the present invention is naturally applicable to standards other than EEE-1394. The present invention is applicable to any environment where a plurality of networks having different network times are integrated into one, and due to this, at least part of the integrated networks encounters a discontinuous change in the network time.

The present invention subtracts an "original time value" that never shows discontinuous change due to network integration from a "network time value" that has a possibility of showing discontinuous change due to network integration, to provide a "cycle-time difference value." With the use of this cycle-time difference value, the present invention generates a time-stamp value. Accordingly, even if network time is discontinuously changed due to network integration, the present invention can continuously play real-time data without being influenced by the discontinuous change. Various modifications will become possible for those skilled in the art after receiving the teaching of the present disclosure without departing from the scope thereof.

What is claimed is:

1. A device capable of correcting time stamp value comprising:
   an original time counter configured to generate and output an original time value;
   a subtracter configured to receive a network time value from the outside and the original time value from the original time counter, subtract the original time value from the network time value, and output the difference as a cycle-time difference value;
   a first adder configured to receive an original time-stamp value generated from the original time value and the cycle-time difference value from the subtracter, add the cycle-time difference value to the original time-stamp value, and output the sum as a time-stamp value;
   a second adder configured to receive an offset value from the outside and the original time value from the original time counter, add the offset value to the original time value, and output the sum as the original time-stamp value; and
   a memory configured to receive the original time-stamp value attached real-time data from the original time-stamp value attacher and output the original time-stamp value attached real-time data in a first-in, first-out manner.

2. A device capable of correcting time stamp value comprising:
   an original time counter configured to generate and output an original time value;
   a subtracter configured to receive a network time value from the outside and the original time value from the original time counter, subtract the original time value from the network time value, and output the difference as a cycle-time difference value;
   a first adder configured to receive an original time-stamp value generated from the original time value and the cycle-time difference value from the subtracter, add the cycle-time difference value to the original time-stamp value, and output the sum as a time-stamp;
   a second adder configured to receive an offset value from the outside and the original time value from the original time counter, add the offset value to the original time value, and output the sum as the original time-stamp value;
   an original time-stamp value attacher configured to receive real-time data from the outside and the original time-stamp value from the second adder, attach the original time-stamp value to the real-time data, and output the original time-stamp value attached real-time data;
   a memory configured to receive the original time-stamp value attached real-time data from the original time-stamp value attacher and output the original time-stamp value attached real-time data in a first-in, first-out manner; and
   an original time-stamp value separator configured to receive the original time-stamp value attached real-time data from the memory, separate the original time-stamp value attached real-time data into the original time-stamp value and the real-time data, and output the separated original time-stamp value and real-time data.

3. The device of claim 2, further comprising:
   a CIP (common isochronous packet) header generator configured to receive the time-stamp value from the first adder, generate a CIP header containing the time-stamp value, and output the CIP header; and
   an ISO (isochronous) packet generator configured to receive an ISO header from the outside, the CIP header from the CIP header generator, and the real-time data from the original time-stamp value separator and generate an ISO packet containing the received ISO header, CIP header, and real-time data.

4. The device of claim 2, further comprising:
   a CIP (common isochronous packet) header generator configured to generate and output a CIP header; and
   an ISO (isochronous) packet generator configured to receive an ISO header from the outside, the CIP header from the CIP header generator, the time-stamp value from the first adder, and the real-time data from the original time-stamp value separator and generate an ISO packet containing the received ISO header, CIP header, time-stamp value, and real-time data.

5. The device of claim 3, further comprising:
   an output controller configured to receive the ISO packet from the ISO packet generator and transmit the ISO packet according to a predetermined communication protocol.

6. The device of claim 4, further comprising:

an output controller configured to receive the ISO packet from the ISO packet generator and transmit the ISO packet according to a predetermined communication protocol.

7. The device of claim 3, the device is a semiconductor device.

8. The device of claim 5, the device is a transmitting device.

9. A method of correcting a time stamp value comprising:

generating and outputting an original time value at an original time counter;

receiving a network time value and an original time value in a subtracter, subtracting the original time value from the network time value, and outputting the difference as a cycle-time difference value;

receiving an original time-stamp value and the cycle-time difference value in a first adder, adding the cycle-time difference value to the original time-stamp value, and outputting the sum as a time-stamp value;

receiving an offset value and the original time value at a second adder, adding the offset value to the original time value, and outputting the sum as the original time-stamp value; and receiving the original time-stamp value attached real-time data at a memory and outputting the original time-stamp value attached real-time data in a first-in, first-out manner.

10. A method of correcting a time stamp value comprising:

receiving a network time value and an original time value in a subtracter, subtracting the original time value from the network time value, and outputting the difference as a cycle-time difference value;

receiving an original time-stamp value and the cycle-time difference value in a first adder, adding the cycle-time difference value to the original time-stamp value, and outputting the sum as a time-stamp value;

receiving an offset value and the original time value at a second adder, adding the offset value to the original time value, and outputting the sum as the original time-stamp value;

receiving real-time data and the original time-stamp value at an original time-stamp value attacher, attaching the original time-stamp value to the real-time data, and outputting the original time-stamp value attached real-time data;

receiving the original time-stamp value attached real-time data at a memory and outputting the original time-stamp value attached real-time data in a first-in, first-out manner; and receiving the original time-stamp value attached real-time data from the memory at an original time-stamp value separator, separating the original time-stamp value attached real-time data into the original time-stamp value and the real-time data, and outputting the separated original time-stamp value and real-time data.

11. The method of claim 10, further comprising:

receiving the time-stamp value at a CIP (common isochronous packet) header generator, generating a CIP header containing the time-stamp value, and outputting the CIP header; and receiving an ISO header, the CIP header, and the real-time data from the original time-stamp value separator at an ISO (isochronous) packet generator, and generating an ISO packet containing the received ISO header, CIP header, and real-time data.

12. The method of claim 10, further comprising:

outputting a CIP header from a CIP header generator; and receiving an ISO header, the CIP header, the time-stamp value from the first adder, and the real-time data from the original time-stamp value separator at an ISO (isochronous) packet generator and generating an ISO packet containing the received ISO header, CIP header, time-stamp value, and real-time data.

13. The method of claim 11, further comprising:

receiving the ISO packet from the ISO packet generator at an output controller and transmitting the ISO packet according to a predetermined communication protocol.

14. The method of claim 12, further comprising:

receiving the ISO packet from the ISO packet generator at an output controller and transmitting the ISO packet according to a predetermined communication protocol.

* * * * *